United States Patent

Warner

[11] 4,061,320
[45] Dec. 6, 1977

[54] TWO CYLINDER SHOCK ABSORBER SYSTEM

[76] Inventor: Joe Frank Warner, 504 Town Creek, Dallas, Tex. 75232

[21] Appl. No.: 682,737

[22] Filed: May 3, 1976

[51] Int. Cl.$^2$ .......................... F16F 5/00; B60G 15/08
[52] U.S. Cl. .................................. 267/64 R; 267/124; 188/314; 188/322; 280/708
[58] Field of Search .............. 267/64 R, 64 A, 2, 124, 267/127; 280/693, 698, 702, 708; 188/289, 298, 322, 314

[56] References Cited

U.S. PATENT DOCUMENTS

| 3,140,082 | 7/1964 | Huber | 267/64 R |
|---|---|---|---|
| 3,547,465 | 12/1970 | Hoffman et al. | 267/64 R |
| 3,945,626 | 3/1976 | Tilkens | 267/64 R |

*Primary Examiner*—James B. Marbert
*Attorney, Agent, or Firm*—Richards, Harris & Medlock

[57] ABSTRACT

A shock absorber system where an outer cylinder having a top closure is connected to a vehicle frame and having a ported bottom closure. An inner cylinder is mounted coaxially in the outer cylinder and has a main piston including a piston rod extending down through the ported bottom closure. The piston is in slidable fluid tight relation to be connected to an axle of the vehicle. The system further includes a cooling cylinder and structure forming a flow channel leading into the cooling cylinder from beneath the main piston. Structure forms a return flow channel from the cooling cylinder into the top of the inner cylinder and includes a check valve. The cooling cylinder includes a gas pressure positioned free piston. Structure further includes a check valve in the main piston for passing liquid from above the main piston to below the main piston upon compression of the main piston and for circulating fluid through the cooling cylinder upon expansion.

3 Claims, 1 Drawing Figure

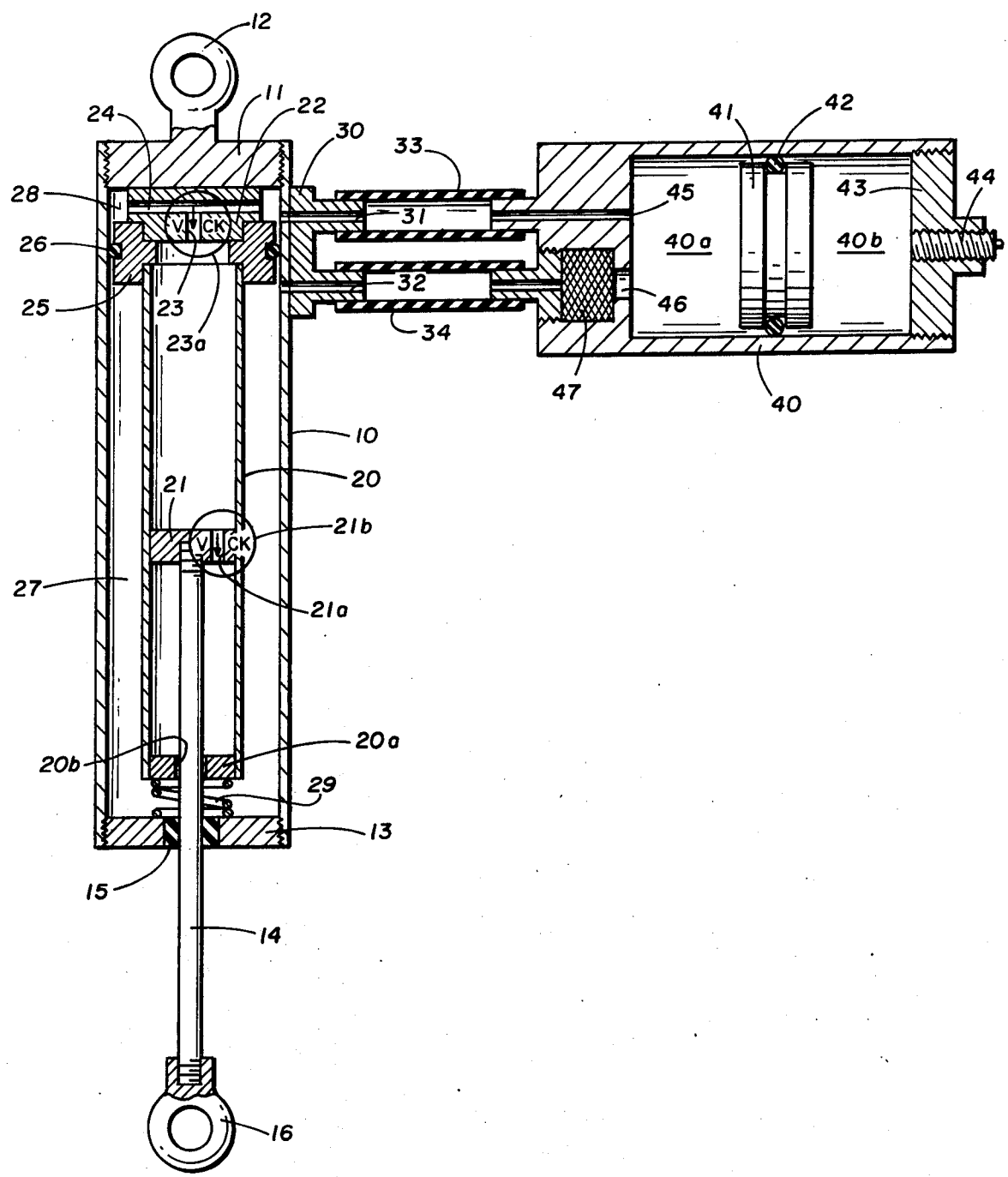

TWO CYLINDER SHOCK ABSORBER SYSTEM

FIELD OF THE INVENTION

This invention relates to shock absorbers, and more particularly relates to an improved two cylinder shock absorber having a fluid cooling cylinder.

BACKGROUND OF THE INVENTION

Shock absorbers mechanically linked to springs of automobiles, trucks and other vehicles are used to dampen the free vibrations of the axles and wheels of the vehicles. These free vibrations, if not restricted by the use of shock abosrbers cause several undesirable conditions. The comfort of the vehicle rider suffers and mechanical damage to the vehicle can result under certain road and vehicle conditions. For example, when a vehicle is traveling on a road having regularly spaced bumps, the vehicle at low speeds will experience an extreme pitching motion and at high speeds will experience extreme vibration of the wheels and axles. These conditions result from the interaction of the road-forced vibrations with the vehicle mass-spring system, and the wheel and axle mass-spring system reaching resonance at different vibrations and speed ratios.

The shock absorbers typically used in vehicles are hydraulic and operate on the dashpot principle, a piston moving in a cylinder filled with oil. Any relative motion between the axle and the vehicle body results in the operation of the shock absorber. This operation includes oil leaking past the piston and cylinder or passing through a spring controlled valve which opens only when a certain predetermined pressure difference exists on the two sides of the piston. Most shock absorbers utilize one-way valves thereby creating different dampening results depending upon whether there is compression or expansion of the shock absorber. This difference in dampening is accomplished by forcing the oil through different sets of apertures by means of check valves. Usually the configuration is such that when the vehicle body and axle are spreading apart, the dampening is greater than when the vehicle and axle are coming together.

Generally, in shock absorbers of single tube design, all valving is contained in the piston of the shock absorber. One-way leaf spring valves control oil flowing through orifices from one side of the piston to the other. On compression, oil is forced by the valving to flow from the high pressure side of the piston to the low pressure side through a certain set of orifices. On extension, the valving forces the oil to flow in the opposite direction through another set of orifices. Dampening in each direction, compression or extension is then controlled by the size and number of orifices available for flow in each direction. Single cylinder shock absorbers suffer from the need for a vapor space in the cylinder to allow for piston rod displacements. This lack of vapor space causes erratic action as air mixes with the oil passing through the valve.

In two cylinder shock absorbers, means are provided to help eliminate the problems caused by the lack of a vapor space in the single cylinder shock absorbers. The inner cylinder acts as a single cylinder shock absorber, but valves on the bottom and top of the inner cylinder work in such a manner so as to pump oil from the bottom of the outer reservoir cylinder up through the inner cylinder, past the piston, and out the top of the outer cylinder. Thus, the inner cylinder is always filled with oil and the erratic nature of the single cylinder shock abosrber is partially eliminated.

While possessing many advantages, two cylinder shock absorbers have several disadvantages. They have insufficient hydraulic fluid capacity so that at high rates of shock absorption they lose, through the effect of temperature on the viscosity of the available hydraulic fluid, their ability to absorb shocks. Shock absorption capability will then be dependent upon the rate at which the shock absorbers are worked. Further, the necessary air volume contained in the conventional two cylinder shock absorbers, to allow for the stroking of the shock absorbers shaft, will in time, allow the oil to become saturated with the air, at continued high rates of shock absorption, the oil on flow through the dampening orifices will not be as resistive as it would with no air in solution. A further disadvantage of two cylinder shock absorbers are that they operate with the air pocket in the upper-most section of the outer cylinder. This dictates that the shock absorber must be mounted so that the heaviest part, the two cylinders and the hydraulic fluid, is connected directly to the unsprung weight of the vehicle, thus adding to the need for shock absorption. A further disadvantage is that metallic particles of wear from within the shock absorber and solid particles taken within the shock absorber through the shaft seal on stroking of the shock absorber are retained within and continuously circulated throughout the shock absorber during use. These particles can plug the tiny orifice passages thus changing the characteristics of these shock absorbers.

Air-oil shock absorbers have been provided where, with a single cylinder, an air-oil floating piston isolates the oil of the shock absorber from a high pressure gas. The shock piston operates within the oil and the displacement of the oil caused by the entry and exit of the shock absorber rod are absorbed by compression and expansion of the gas as transmitted by the air-oil piston. However, air-oil shock absorbers also suffer from several disadvantages. Since the oil on the face side of the piston, between it and the free air-oil piston, is only contained by the air-oil piston, high rates of compressive force applied to the shock absorber will cause an air vapor cavity to form on the low pressure side of the piston because oil is unable to flow fast enough through the piston orifices. On a reversal of forces, from compressive to extensive, this vapor cavity will collapse, thereby causing a hydraulic shock of pressure to be transmitted throughout the hydraulic system. Eventually, the hydraulic seal on the piston rod will fail or the mechanical build-up of stresses on the tube, piston or cylinder will become too great for the system to withstand.

SUMMARY OF THE INVENTION

The present invention is directed to an improved two cylinder shock absorber which substantially eliminates or reduces the disadvantages associated with prior two cylinder shock absorbers.

In accordance with the present invention, a shock absorber system includes an outer cylinder having a top closure connected to a vehicle frame and having a ported bottom closure. An inner cylinder is mounted coaxially in the outer cylinder and includes a main piston and a piston rod extending down through the ported bottom closure. The piston rod is in slidable fluid tight relation to be connected to the vehicle axle. The system includes a cooling cylinder and structure forming a flow channel leading into the cooling cylinder from beneath the main piston. Structure forms a return flow channel from the cooling cylinder into the top of the inner cylinder and includes a check valve. A gas pressure positioned free piston is located in the cooling cylinder. The system further includes structure including a check valve in a restricted portion of the main piston for passing liquid from above the main piston to below the main piston upon compression and for circulating fluid through the cooling cylinder upon expansion.

DESCRIPTION OF THE DRAWING

Novel features believed characteristic of the invention are set forth in the appended claims. The invention itself, however, as well as further advantages thereof, will best be understood by reference to the following detailed description of an illustrative embodiment taken in conjunction with the accompanying drawing in which a side elevation view, in section of the preferred embodiment of the present invention in shown.

DESCRIPTION OF THE PREFERRED EMBODIMENT

The FIGURE illustrates a two cylinder type shock absorber system embodying the present invention. An outer cylinder 10 is provided with an end plate 11, which is threaded into the upper end thereof. The end plate 11 is provided with an eyelet 12 which serves as a mounting hole to attach the unit to the frame of a vehicle. The lower end of the outer cylinder 10 is closed by a ported closure disk 13, which is threaded into the lower end of the cylinder 10 and is provided with a central aperture through which piston rod 14 extends. The piston rod passes through a liquid seal member 15.

The lower end of the piston rod 14 is provided with an eyelet 16, which serves as a mounting hole for attachment to an axle of the vehicle. The upper end of the piston rod 14 extends into an inner cylinder 20. Piston rod 14 carries a piston 21 which serves to work inside the cylinder 20. Piston 21 includes a bore 21a, within which a spring loaded check valve 21b is located.

The lower end of cylinder 20 is closed by a ported closure member 20a having an orifice 20b, which provides for passage of piston rod 14. The upper end of inner cylinder 20 is stopped by a closure member 22, which has a central bore 23. Central bore 23 includes a spring loaded check valve 23a, which allows unrestricted flow into cylinder 20 and is connected by way of lateral passageway 24 to the upper annular zone 28 outside of the inner cylinder 20. Also provided is a spacer 25, which is mounted on the upper end of inner cylinder 20. Spacer 25 carries an isolation O-ring 26, which isolates the lower annular zone 27 from upper annular zone 28 above O-ring 26.

A spring 29 is located between closure member 20a of inner cylinder 20 and ported closure disk 13 of outer cylinder 10. Spring 29 urges inner cylinder 10 toward end plate 11.

A fixture 30 having a first passageway 31 leads from upper annular zone 28. A second passageway 32 leads from lower annular zone 27. Passageways 31 and 32 lie on opposite sides of O-ring 26. Flexible tubes 33 and 34 lead to a cooling cylinder 40. Cooling cylinder 40 has a free floating piston 41 therein with an O-ring 42, which seals against the inner walls of cooling cylinder 40. The end of cylinder 40 opposite tubes 33 and 34 is closed by a member 43 which is screwed therein. Member 43 is provided with a valved port 44, which is adapted to permit the introduction of compressed gas into cylinder 40 pneumatically to bias the piston 41 towards the left end thereof.

Tube 33 is connected to the interior of the cooling cylinder 40 by way of channel 45. Tube 34 is connected to the interior of cylinder 40 by way of channel 46. Channel 45 is a tubular channel, while channel 46 is enlarged to receive and contain a filter element 47. By this means, there can be fluid flow from lower annular zone 27 to upper annular zone 28, but such flow is exclusive by way of the chamber 40a with the chamber 40b being supplied with a predetermined level of compressed gas.

In operation of the shock absorber system of the present invention, oil normally is contained within both cylinders 10 and 20 of a sufficient volume to fill both cylinders and chamber 40a of cooling cylinder 40. Dampening action of the shock absorber takes place by reason of the action of check valve 23a contained within closure member 22, check valve 21b contained within the piston 21 and orifice 20b contained within ported closure member 20a. The action of check valves 23a and 21b and orifice 20b offer greater resistance to extension of the shock absorber than to its compression.

Upon compression of the shock absorber, piston rod 14 carrying piston 21 will move upward within cylinder 20, such that in the fully compressed position piston 21 will lie adjacent closure member 22. In the compression stage oil will flow from above piston 21 through check valve 21b to the lower side of piston 21. Upon extension of the shock absorber, the downward movement of piston 21 will force the oil through orifice 20b passing through ported closure member 20a. Oil will then flow through lower annular zone 27, through passageway 32, through tube 34 and into chamber 40a via channel 46. Under the force exerted by piston 41 the oil will then flow through channel 45, tube 33, passageway 30 and into upper annular zone 28. Check valve 23a will then permit the oil to flow from zone 28 back into the inner cylinder 20. The passage of the oil through chamber 40a of cooling cylinder 40 allows the oil to cool between compression and extension of the shock absorber. This cooling greatly increases the shock absorber's ability to withstand high rates of working.

Thus, in accordance with the present invention, the circulation of oil from shock absorber cylinders 10 and 20, through the filter 47 to cooling cylinder 40, to the shock absorber and back to cooling cylinder 40 decreases the temperature increase of the oil in the shock absorber. This temperature decrease is accomplished by employing the cooling cylinder 40 which increases the working volume of the oil and cools the oil by passing it through the connecting channels to the cooling cylinder 40 and back again to the shock absorber. The increased working volume of hydraulic fluid minimizes the problems associated with conventional shock absorbers regarding the need for a vapor space as above described.

Having described the invention in connection with certain specific embodiments thereof, it is to be understood that further modifications may now suggest themselves to those skilled in the art and it is intended to cover such modifications as fall within the scope of the appended claims.

What is claimed is:

1. A shock absorber system comprising:

a. an outer cylinder having a top closure to be connected to a vehicle frame and a removable ported bottom closure;

b. a closed top inner cylinder slidably mounted coaxially in said outer cylinder and having a peripheral seal to the walls of said outer cylinder near the top thereof;

c. a spring between said inner cylinder and said bottom closure to urge said inner cylinder toward said top closure;

d. a main piston in said inner cylinder having a piston rod extending down through said ported bottom closure in slidable fluid tight relation to be connected to a vehicle axle;

e. a cooling cylinder;

f. a flow line leading into said cooling cylinder from beneath said seal;

g. a return flow line leading from said cooling cylinder into said outer cylinder above said seal;

h. a check valve in the top of said inner cylinder for flow from above said seal into said inner cylinder;

i. a gas pressure positioned free piston in said cooling cylinder; and j. structure including a check valve in said main piston for passing liquid from above said main piston to below main piston upon compression and for circulating fluid through said cooling cylinder upon expansion.

2. A shock absorber system, which comprises:

a. an outer cylinder having a top closure and a ported bottom closure;

b. an inner cylinder spring-mounted coaxially in said outer cylinder;

c. free piston means in fluid communication with said outer cylinder for recirculating fluid during an expansion of said system;

d. spacer means mounted between said inner cylinder and said outer cylinder and in slidable fluid tight relation with the inner walls of said outer cylinder for metering fluid from said free piston means to said inner cylinder, and from said outer cylinder to said free piston means; and e. force piston means slidably mounted in said inner cylinder and having a piston rod extending downward through said ported bottom closure in slidable fluid tight relation for operating in cooperation with said spacer means to circulate fluid through said inner cylinder.

3. A shock absorber system, which comprises:

a. an outer cylinder having a top closure and a ported bottom closure;

b. an inner cylinder mounted coaxially in said outer cylinder;

c. spacer means positioned between the top of said inner cylinder and said outer cylinder and having a peripheral liquid seal in contact with the inner surface of said outer cylinder for separating filtered fluid from worked fluid;

d. main piston means in said inner cylinder having a piston rod extending through said ported bottom closure in slidable fluid tight relation for cooperating with said spacer means to circulate fluid through said system;

e. structure including a filter for forming an exhaust flow channel leading from beneath said main piston, and a return flow channel leading to said spacer means; and f. free piston means in fluid communication with said structure for receiving said filtered fluid from said exhaust flow channel, and supplying said filtered fluid under pressure to said spacer means.

* * * * *